United States Patent
Huang et al.

(10) Patent No.: US 6,781,735 B2
(45) Date of Patent: Aug. 24, 2004

(54) FABRY-PEROT CAVITY MANUFACTURED WITH BULK MICRO-MACHINING PROCESS APPLIED ON SUPPORTING SUBSTRATE

(76) Inventors: Liji Huang, 6 Results Way, Cupertino, CA (US) 95014; Yahong Yao, 6 Results Way, Cupertino, CA (US) 95014; Naiqian Han, 6 Results Way, Cupertino, CA (US) 95014; Gaofeng Wang, 6 Results Way, Cupertino, CA (US) 95014

(*) Notice: Subject to any disclaimer, the term of this patent is extended or adjusted under 35 U.S.C. 154(b) by 242 days.

(21) Appl. No.: 10/053,328
(22) Filed: Jan. 16, 2002

(65) Prior Publication Data
US 2003/0016436 A1 Jan. 23, 2003

Related U.S. Application Data
(60) Provisional application No. 60/307,110, filed on Jul. 23, 2001.

(51) Int. Cl.$^7$ .............................. G02F 1/03; H01S 3/08
(52) U.S. Cl. ..................... 359/245; 359/290; 359/291; 372/92; 372/96; 372/20

(58) Field of Search ................... 359/245, 248, 359/290, 291, 260; 372/19–22, 92, 96

(56) References Cited

U.S. PATENT DOCUMENTS

| | | | | |
|---|---|---|---|---|
| 5,500,761 A | * | 3/1996 | Goossen et al. | 359/290 |
| 6,373,632 B1 | * | 4/2002 | Flanders | 359/291 |
| 2002/0054416 A1 | * | 5/2002 | Huang et al. | 359/245 |

* cited by examiner

*Primary Examiner*—Georgia Epps
*Assistant Examiner*—M. Hasan
(74) *Attorney, Agent, or Firm*—Bo-In Lin (57) ABSTRACT

The present invention discloses an electro-optical device support on a substrate. The electro-optical device includes two face-to-face freestanding membranes each supported near a top surface on one of two bonded substrates for defining a resonant cavity between the two membranes. Each of the substrates having an entire bulk-portion opposite the cavity etched off as a bulk micro-machining opening extended from each of the membranes through a bottom surface of the substrates.

23 Claims, 7 Drawing Sheets

FABRY-PEROT CAVITY MANUFACTURED WITH BULK MICRO-MACHINING PROCESS APPLIED ON SUPPORTING SUBSTRATE

This Application claims a priority date of Jul. 23, 2001 benefited from a previously filed Provisional Patent Application 60/307,110 filed on Jul. 23, 2001 by one of the Applicants of this Formal Patent Application.

BACKGROUND OF THE INVENTION

1. Field of the Invention

This invention relates generally to apparatus and methods for manufacturing optical and photonic devices by employing the micro-opto-electro-mechanical system (MOEMS) technologies. More particularly, this invention is related to configuration and method of manufacturing tunable Fabry-Perot cavity by applying a bulk micro-machining process on a supporting substrate to improve the production yield with reduced process irregularities produced by conventional surface micro-machining processes.

2. Description of the Related Art

Recent development of the optical device manufacture technologies is still faced with a technical difficulty that the support substrate for the freestanding membrane is often produced with undercut irregularities caused by conventional surface micro-machining process in forming the membrane. These undercut irregularities often cause a reduction of production yield and limit the usefulness of the micro-opto-electro-mechanical system (MOEMS) technologies in manufacturing micro-optical devices with mass production at further reduced production costs. Current manufacturing processes apply a surface micro-machining technique uses oxide or phosphorous doped silicate glass (PSG) as the sacrificial etch materials. Meanwhile, the sacrificial etch layer composed of the PSG material is also implemented as structural elements in the optical device formed as the chamber poles. A typical example is the optical modulators implemented with the configuration of a mechanical anti-reflection (MAR) switch. The manufacture irregularities produced by applying the dry or wet etching processes and using the conventional sacrificial etch materials adversely affect the production yields and the switching/attenuation performance and also the reliability of the devices. The next generation broadband optical communication system requires significant scale-down of size and reduction in production costs from current standards based on technology of devices by mechanically assembling optical components. Recent development of silicon based optical single switch modulator and integrated multiple-channel attenuation/switching modules provides first step in a pathway of achieving improvement to provide optical devices suitable for next generation system applications. However, the irregularities of the supporting structure for a freestanding membrane caused by the ineffectiveness of the stop etching configuration due to sacrificial layer undercut in the membrane forming processes often limit the applications and production yields when such technologies are applied.

Therefore, a still need exists in the art in the field of the optical signal transmission systems to provide a configuration and method of manufacture to overcome such difficulties and limitations. It is desirable that such method can provide simplified manufacturing processes such that cost reduction and production yield together with the product reliability can be improved. In addition, it is further desired that more process control can be provided for more precisely controlling the manufacturing processes to produce optical devices with size and dimensions with better controlled accuracy.

SUMMARY OF THE PRESENT INVENTION

It is therefore an object of the present invention to provide new and improved configuration and methods for manufacturing optical devices to substantially eliminate the undercut irregularities on a supporting substrate such that the problems and difficulties as encountered in the prior art may be resolved.

Specifically, it is the object of this invention to provide new and improved manufacture methods and configurations to form well-defined cavity by applying a bulk micro-machining process on the supporting substrate to eliminate the cavity undercut irregularities resulted from conventional etching processes. Instead of applying a surface micro-machining process to form the freestanding membrane by etching through an etching window opened on the top surface, a bulk machining process is employed to remove an entire portion below a membrane. The poles of the chamber are formed as spacer layer surrounding the freestanding membrane. The Fabry-Perot cavity is formed by stacking and face-to-face bonding the spacers with the freestanding membrane disposed at a distance away from each other to form a resonant cavity between the membranes.

Briefly, in a preferred embodiment, this invention discloses a method for forming an optical device on a substrate. The method includes the steps of a) forming a membrane layer on a top surface of the substrate. And, b) applying a bulk micro-machining process for etching off an entire bulk portion of the substrate below the membrane layer whereby the membrane layer becoming a freestanding membrane layer above the entire bulk portion that is etched off. In a preferred embodiment, the step a) of forming a membrane layer further includes a step of forming the membrane layer with a bulk-etch protection bottom layer on the top surface of said substrate. With an etch-protection bottom layer, the membrane layer will remain intact when the bulk micro-machining process is applied to remove the entire bulk portion underneath the membrane layer.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
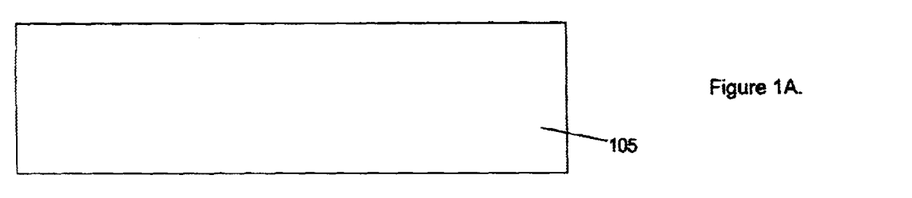
FIGS. 1A to 1J are a series of cross sectional views for illustrating the processing sequence in manufacturing a tunable Fabry-Perot optical device according a method of this invention.
Figure 1B:
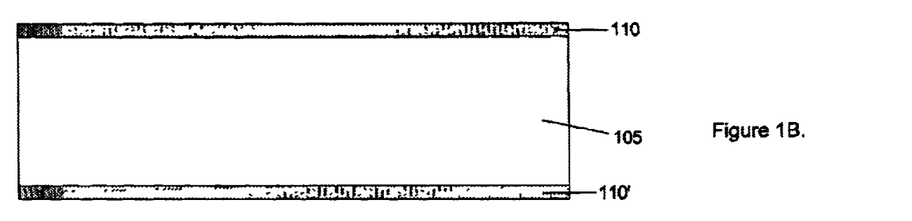
Figure 1C:
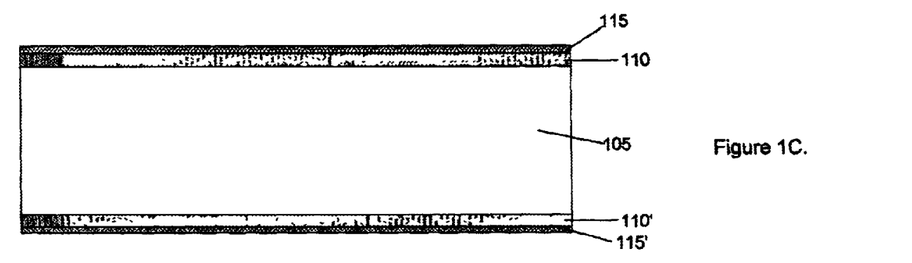
Figure 1D:
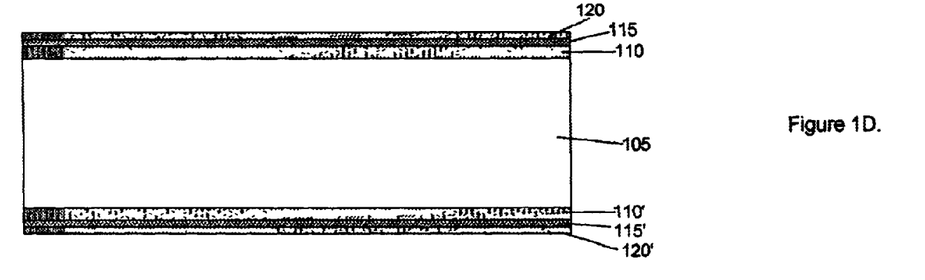
Figure 1E:
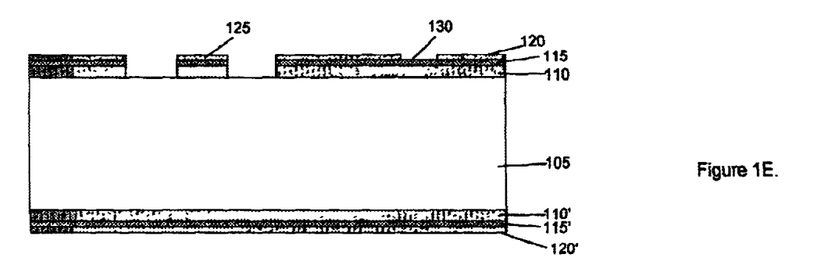
Figure 1F:
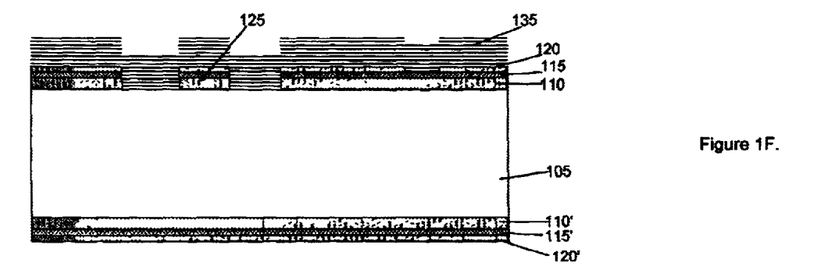
Figure 1G:
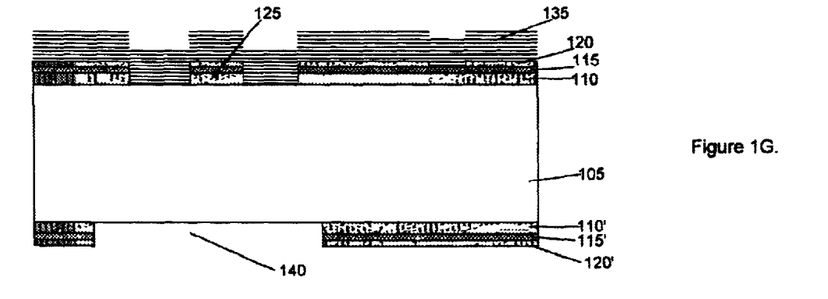
Figure 1H:
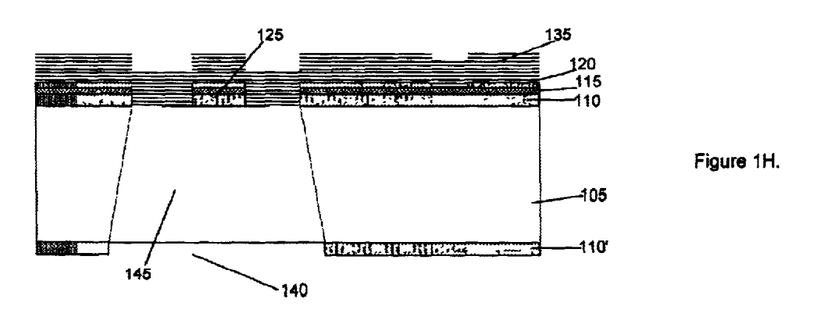
Figure 1I:
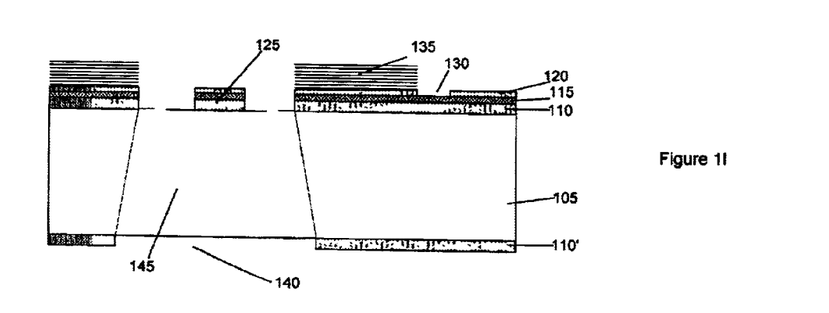
Figure 1J:
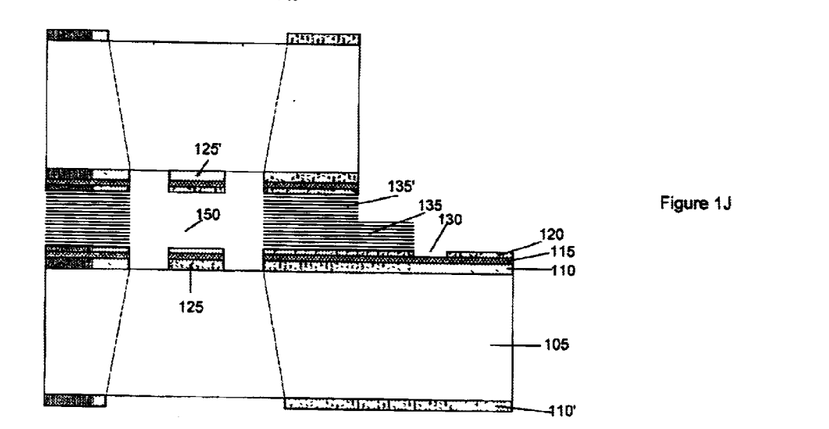

Referring to FIGS. 1A to 1I for a series of cross sectional views for showing the manufacturing processes of an optical device with an electrically tunable membrane formed with an optical chamber. The process begins by providing a substrate 105 that may be a single crystal silicon substrate with a crystalline orientation of <100> (FIG. 1A). A first membrane and bulk-etch stop layer 110 and 110' composed of silicon nitride is formed on top of the substrate 105 (FIG. 1B) by applying a low-pressure chemical vapor deposition (LPCVD) process. A second membrane and electrode layer 115 and a bottom layer 115' composed of polycrystalline silicon is formed on top of the first membrane layer 105 by applying a low pressure chemical vapor deposition (LPCVD) process (FIG. 1C). A third membrane and bulk-etch protection layer 120 and a bottom layer 120' composed of silicon nitride is formed on top of the second membrane layer 115 by applying a low-pressure chemical vapor deposition (LPCVD) process (FIG. 1D). A reactive ion etch process is then employed to open etch through three top layers, layers 110, 115 and 120 for opening windows to define the membrane 125 (FIG. 1E). An additional reactive ion etch process will etch the silicon nitride and open the electrode window 130. A plasma enhanced chemical vapor deposition (PECVD) process or LPVD process is applied to form oxide layer 135 overlaying the entire top surface (FIG. 1F). In FIG. 1G, a reactive ion etch process is applied to open a bulk etch window 140 in the layers 110', 115' and 120'. In FIG. 1H, a bulk etch process is employed to etch the substrate bulk from the bulk etch window 140 to remove a bulk portion of the substrate below the membrane 125. A bulk opening 145 is formed for the making of the freestanding membrane with the bulk etching process. This etch process will also remove of layers 115' and 120'. In FIG. 1I, another wet chemical etch (such as hydrofluoric acid etch or buffeted oxide etch process) is performed to remove the oxide layer 130 from above and around the membrane layer 125 to a totally release of the membrane from surrounding attachment thus make a total freestanding membrane 125. A bottom half of the cavity is formed with the cavity defined and surrounded by spacer layer 135 having a thickness of quarter wavelength $\lambda/4$. In FIG. 1J, a half-wavelength $\lambda/2$ Fabry-Perot cavity is completed by stacking the top half of the cavity with identical structure on top of the bottom half of the cavity. The space layer 135' is stacked on top of the bottom space layer 135. The spacer layers 135 and 135' are bonded together and two free standing membranes 125 and 125' are arranged in a face-to-face configuration across the cavity 150 defined by the spacer 135 and 135'.

There are three techniques to carry out the bulk micro-machining process taking advantage of the etch-selectivity that depends on the crystal orientation of the silicon wafer. The first approach of a micro-machining process using Si(100) wafer. A silicon nitride as mask is employed because the silicon nitride etching-rate in KOH is less than 1 nm/min. A wet KOH bulk etch is performed from the etch window opened on the backside of the silicon substrate that has a [111]/[100] selectivity of 100:1 and an etch rate of approximately 1 micrometer per minute. In a second approach, a silicon nitride mask is used and a TMAH ($(CH_3)_4NOH$) etch is applied. The silicon nitride etch rate in TMAH is ~1 nm/min. A wet TMAH bulk etch is performed from the etch window opened on the backside of the silicon substrate that has a [111]/[100] selectivity of 50:1 and an etch rate of approximately 1 micrometer per minute. A third technique to carry out the bulk micro-machining process is to apply a high aspect ratio dry etch approach, using silicon oxide as mask and etch stop.

Figure 2A:
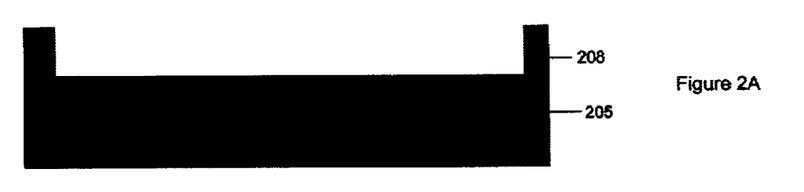
FIGS. 2A to 2K are a series of cross sectional views for illustrating the processing sequence in manufacturing a tunable Fabry-Perot optical device according a method of this invention.
Figure 2B:
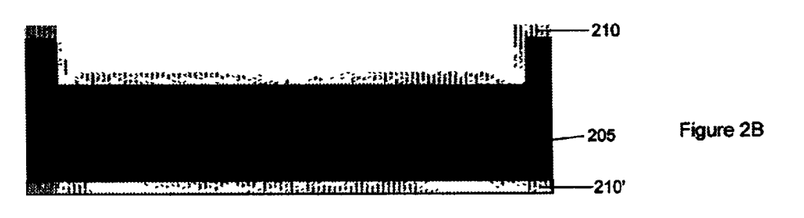
Figure 2C:
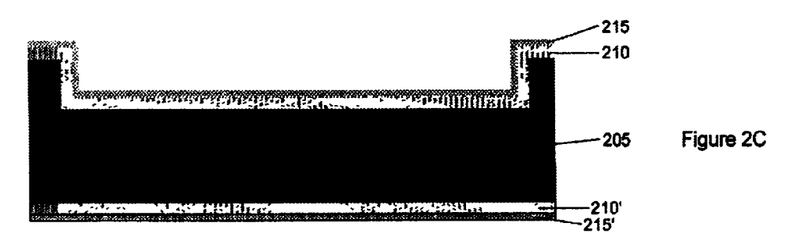
Figure 2D:
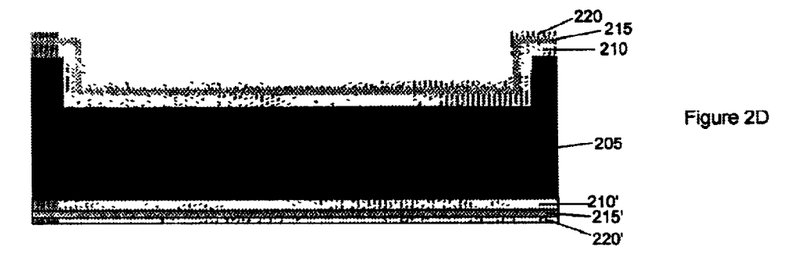
Figure 2E:
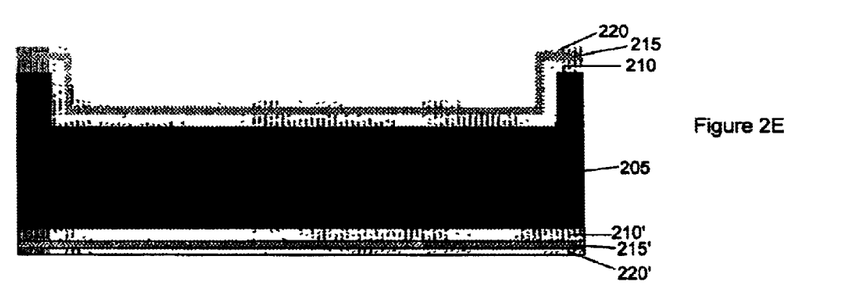
Figure 2F:
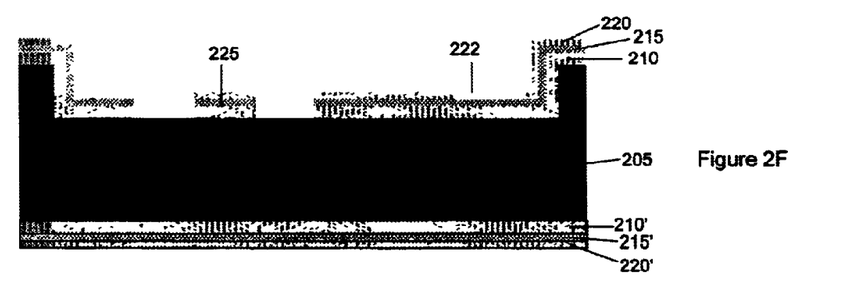
Figure 2G:
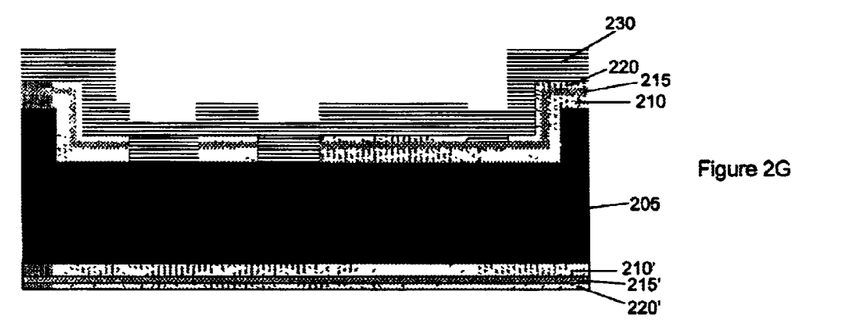
Figure 2H:
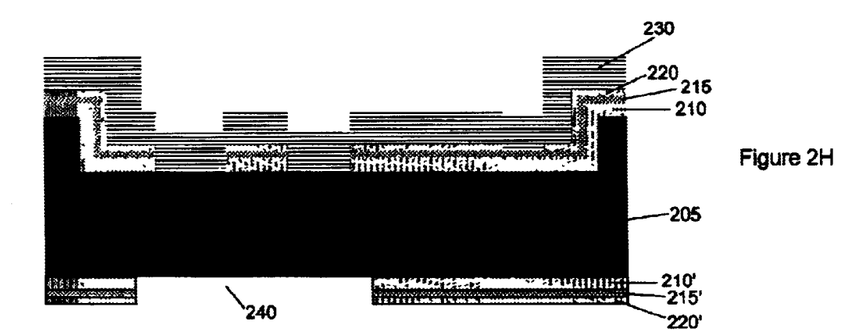
Figure 2I:
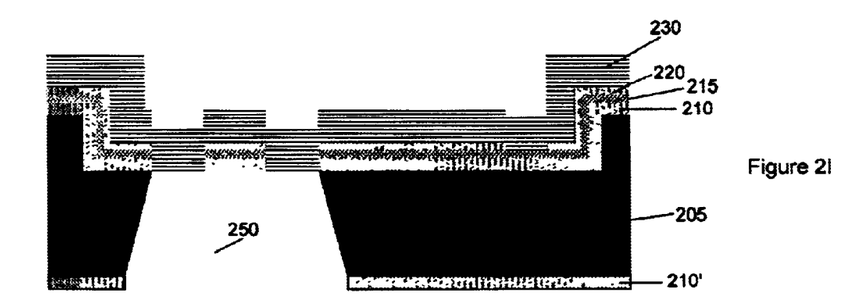
Figure 2J:
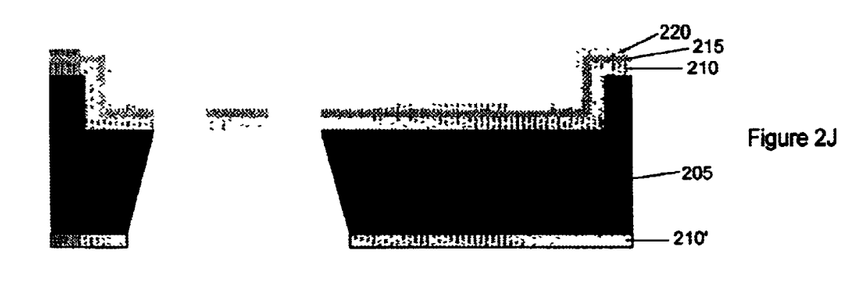
Figure 2K:
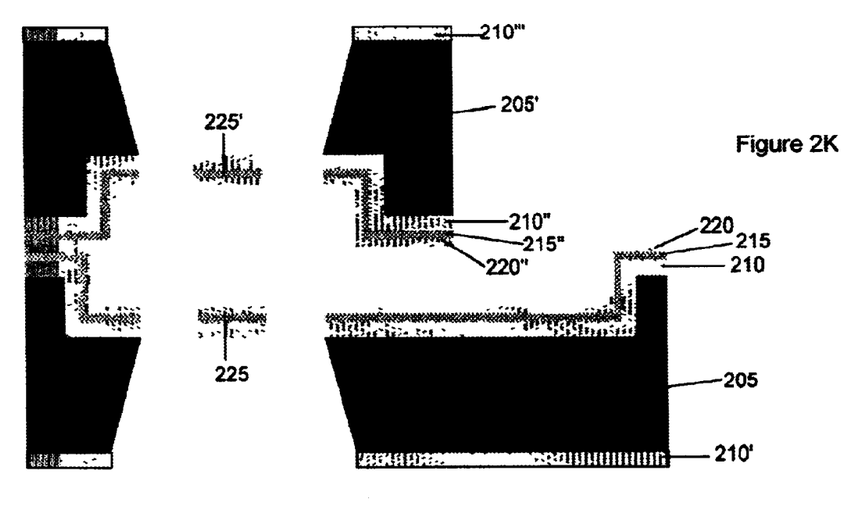

FIGS. 2A to 2K are a series of cross sectional views for showing the manufacturing processes to form another Fabry-Perot cavity with a bulk etching technique. In FIG. 2A, a recess is opened on a substrate 205 where the recess is surrounded by a spacer wall 208. A first membrane and bulk etch stop layer 210 and 210' composed of silicon nitride are formed respectively by employing a LPCVD process on top and bottom of the substrate 210 with the recess. In FIG. 2C, a second membrane and electrode layer 215 and a bottom layer 215' composed of polycrystalline silicon are formed by applying a LPCVD process. In FIG. 2D, a third membrane and etch protection layer 220 and a bottom layer 220' composed of silicon nitride are formed by employing a LPCVD process. In FIG. 2E, a reactive ion etch is first applied to open an electrode window 222 followed by another reactive ion etching process to define the membrane 225 (FIG. 2F). In FIG. 2G, a LPCVD or PECVD process is applied to form oxide protection layer 230 on top of the membrane 225 and the silicon nitride layer 220 and in FIG. 2H, a bulk-etch window 240 is opened by using a reactive ion etching process (FIG. 2I). A bulk etch is performed by removing the bulk portion of the substrate 205 underneath the membrane. A bottom cavity 250 is formed below the membrane 225. In FIG. 2J, the oxide protection layer 230 is removed from the entire top surface. Then the Fabry-Perot cavity is formed by stacking a top cavity structure of identical structure on top of the bottom cavity structure with the membrane 225 face-to-face with a top membrane 225'. The height of the spacer wall 208 and the thickness of the layers 210, 215 and 220 determine the distance between the membranes 225 and 225'.

According to above descriptions, the present invention discloses a method for forming a tunable Fabry-Perot optical device on a substrate. The method includes the steps of a) forming a membrane layer on a top surface of the substrate. And, b) applying a bulk-micro machining process for etching off an entire bulk portion of the substrate below the membrane layer whereby the membrane layer becoming a freestanding membrane layer above the entire bulk portion that is etched off. And c) bonding two identical substrate with the freestanding membrane and a pre-formed spacer together to form the Fabry-Perot cavity. In a preferred embodiment, the step a) of forming a membrane layer further includes a step of forming the membrane layer with a bulk-etch protection bottom layer on the top surface of said substrate. With a etch protection bottom layer, the membrane layer will remain intact when the bulk micro-machining process is applied to remove the entire bulk portion underneath the membrane layer.

According to above descriptions, this invention further discloses an optical device. The optical device includes two face-to-face freestanding membranes each supported near a top surface on one of two bonded substrates for defining a resonant cavity between the two membranes. Each of the substrates having an entire bulk-portion opposite the cavity etched off as a bulk micro-machining opening extended from each of the membranes through a bottom surface of the substrates. In a preferred embodiment, the resonant cavity defining a distance of $N(\lambda/4)$ between the two freestanding membranes where N is a positive integer and $\lambda$ is a wavelength of an optical signal. In another preferred embodiment, the two freestanding membranes having identical layer structure formed by a same set of manufacturing processes carried out on a single substrate wafer. In another preferred embodiment, the resonant cavity is surrounded by a cavity wall formed with two cavity spacers stacked and bonded for disposing the two freestanding membranes face-to-face across the resonant cavity. In another preferred embodiment, each of the two cavity spacers having an identical layer structure and a same thickness. In another preferred embodiment, each of the two cavity spacers having an identical layer structure formed by a same set of manufacturing processes on a single substrate wafer. In another preferred embodiment, each of the two freestanding membranes having multiple layers. In another preferred embodiment, each of the two freestanding membranes having odd number of layers. In another preferred embodiment, each of the two freestanding membranes having odd number of layers arranged with a symmetrical layer structure symmetrical to a central layer. In another preferred embodiment, each of the two freestanding membranes having an electrically conductive layer provided for controlling the membranes.

According to the above descriptions and drawings, an optical device is disclosed in this invention. The optical device includes a substrate having a through-hole. The optical device further includes two face-to-face freestanding membranes disposed in the through-hole formed as membrane layers extended across the through hole and supported on the substrate for providing a resonant cavity between the two membranes. According to FIG. 1I and FIG. 2J, this invention further discloses a substrate. The substrate includes a through-hole in the substrate. And, the substrate further includes a freestanding membrane disposed in the through-hole formed as a membrane layer extended across the through hole and supported on the substrate. In a preferred embodiment, the freestanding membrane disposed near a top surface of the substrate. And the substrate further includes a chamber spacer disposed on the top surface surrounding the membrane.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An optical device comprising:
two face-to-face freestanding membranes each supported near a top surface on one of two bonded substrates for defining a resonant cavity between said two membranes;
each of said substrates having an entire bulk-portion opposite said cavity etched off as a bulk micromachining opening extended from each of said membranes through a bottom surface of said substrates.

2. The optical device of claim 1 wherein:
said resonant cavity defining a distance of $N(\lambda/4)$ between said two freestanding membranes where N is a positive integer and $\lambda$ is a wavelength of an optical signal.

3. The optical device of claim 1 wherein:
said two freestanding membranes having identical layer structure formed by a same set of manufacturing processes carried out on a single substrate wafer.

4. The optical device of claim 1 wherein:
said resonant cavity is surrounded by a cavity wall formed with two cavity spacers stacked and bonded for disposing said two freestanding membranes face-to-face across said resonant cavity.

5. The optical device of claim 4 wherein:
each of said two cavity spacers having an identical layer structure and a same thickness.

6. The optical device of claim 4 wherein:
each of said two cavity spacers having an identical layer structure formed by a same set of manufacturing processes on a single substrate wafer.

7. The optical device of claim 1 wherein:
each of said two freestanding membranes having multiple layers.

8. The optical device of claim 1 wherein:
each of said two freestanding membranes having odd number of layers.

9. The optical device of claim 1 wherein:
each of said two freestanding membranes having odd number of layers arranged with a symmetrical layer structure symmetrical to a central layer.

10. The optical device of claim 1 wherein:
each of said two freestanding membranes having an electrically conductive layer provided for controlling said membranes.

11. An optical device comprising:
a substrate having a through-hole; and
two face-to-face freestanding membranes disposed in said through-hole formed as membrane layers extended across said through hole and supported on said substrate for providing a resonant cavity between said two membranes.

12. The optical device of claim 11 wherein:
said resonant cavity defining a distance of $N(\lambda/4)$ between said two freestanding membranes where N is a positive integer and $\lambda$ is a wavelength of an optical signal.

13. The optical device of claim 11 wherein:
said two freestanding membranes having identical layer structure formed by a same set of manufacturing processes carried out on a single substrate wafer.

14. The optical device of claim 11 wherein:
said resonant cavity is surrounded by a cavity wall formed with two cavity spacers stacked and bonded for disposing said two freestanding membranes face-to-face across said resonant cavity.

15. The optical device of claim 14 wherein:
each of said two cavity spacers having an identical layer structure and a same thickness.

16. The optical device of claim 14 wherein:
each of said two cavity spacers having an identical layer structure formed by a same set of manufacturing processes on a single substrate wafer.

17. The optical device of claim 11 wherein:
each of said two freestanding membranes having multiple layers.

18. The optical device of claim 11 wherein:
each of said two freestanding membranes having odd number of layers.

19. The optical device of claim 11 wherein:
each of said two freestanding membranes having odd number of layers arranged with a symmetrical layer structure symmetrical to a central layer.

20. The optical device of claim 11 wherein:
each of said two freestanding membranes having an electrically conductive layer provided for controlling said membranes.

21. A substrate comprising:
a through-hole in said substrate; and
a freestanding membrane disposed in said through-hole formed as a membrane layer extended across said through hole and supported on said substrate.

22. The substrate of claim 21 wherein:
said free standing membrane disposed near a top surface of said substrate; and
a chamber spacer disposed on said top surface surrounding said membrane.

23. The substrate of claim 21 wherein:
said free standing membrane disposed near a top surface of said substrate; and
a chamber spacer having a thickness of $N(\lambda/8)$ disposed on said top surface surrounding said membrane where N is a positive integer and $\lambda$ is a wavelength of an optical signal.

* * * * *